United States Patent [19]

Knepler

[11] Patent Number: 5,058,195
[45] Date of Patent: Oct. 15, 1991

[54] THERMISTOR MOUNTING ARRANGEMENT

[75] Inventor: John T. Knepler, Chatham, Ill.

[73] Assignee: Bunn-O-Matic Corporation, Springfield, Ill.

[21] Appl. No.: 534,723

[22] Filed: Jun. 7, 1990

[51] Int. Cl.[5] .......................... H01C 7/13; H05B 1/02; E24H 1/20
[52] U.S. Cl. .................................... 392/442; 392/447; 392/453; 392/501; 392/498; 338/22 R; 338/28; 99/281; 374/209; 374/179; 374/158
[58] Field of Search ........................ 392/442, 446–448, 392/451, 453, 455, 498, 501; 374/185, 158, 208–209, 178–179; 338/22 R, 28; 99/281

[56] References Cited

U.S. PATENT DOCUMENTS

| | | | |
|---|---|---|---|
| 3,646,494 | 2/1972 | Waseleski, Jr. et al. | 338/26 |
| 4,437,084 | 3/1984 | Clayton, Jr. | 338/28 |
| 4,453,835 | 6/1984 | Clawson et al. | 374/185 |
| 4,531,046 | 7/1985 | Stover | 99/305 |
| 4,955,980 | 9/1990 | Masuo | 374/185 |

*Primary Examiner*—Bruce A. Reynolds
*Assistant Examiner*—John A. Jeffery
*Attorney, Agent, or Firm*—Trexler, Bushnell, Giangiorgi & Blackstone, Ltd.

[57] ABSTRACT

An elongate hollow tubular assembly mounts a temperature sensing element in a reservoir to determine the temperature of a liquid in the reservoir. The tubular assembly includes an inner tubular member constructed of a thin, light-weight, electrically insulating and thermally conducting material, an intermediate tubular member constructed of a thin, heat-sealable, dielectric material, having an end thereof which extends into the reservoir heat-sealed; and an outer tubular member constructed of a moldable, water-impervious, heat-resistant and durable material. A sealing arrangement is provided for sealing an end of the outer tubular member which extends into the reservoir.

8 Claims, 1 Drawing Sheet

U.S. Patent
Oct. 15, 1991
5,058,195
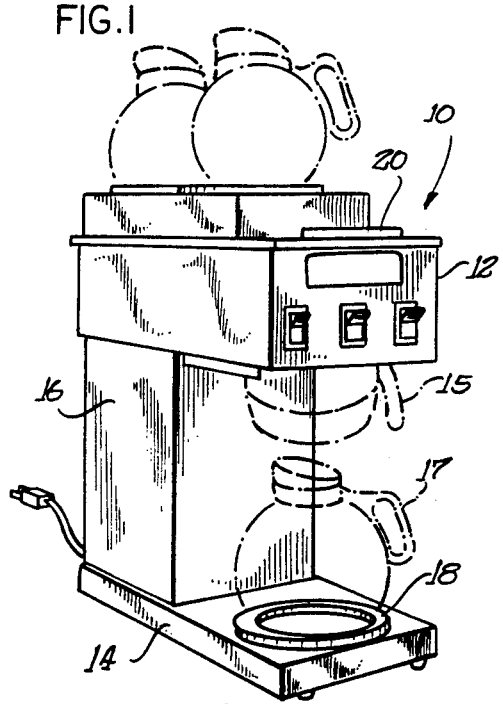
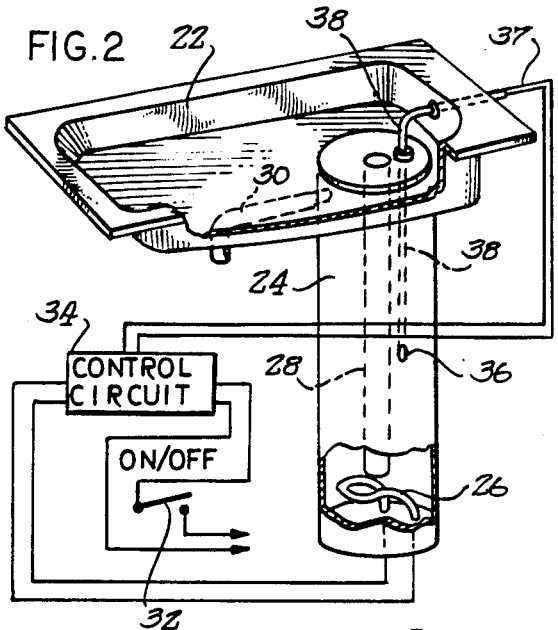
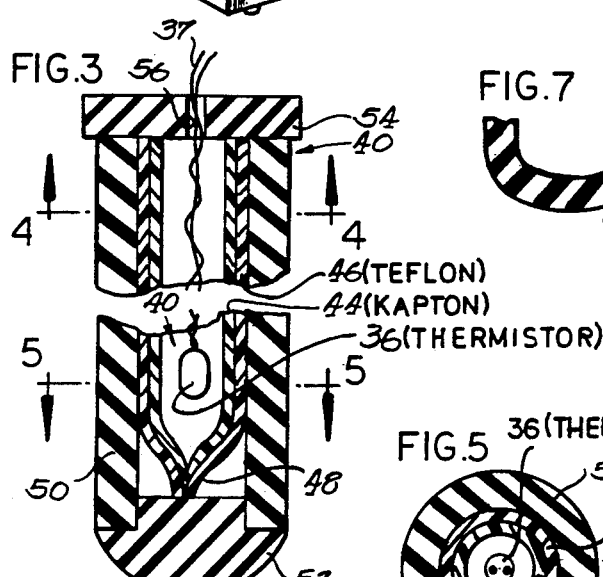
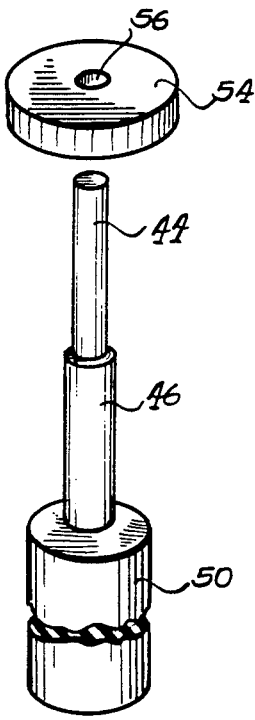
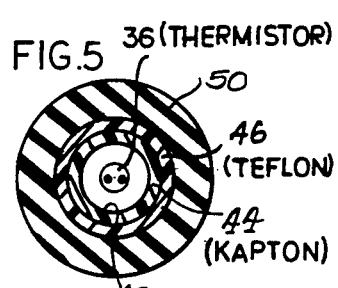
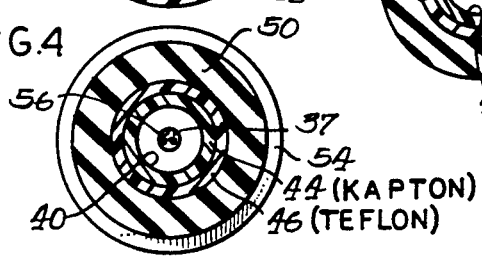

THERMISTOR MOUNTING ARRANGEMENT

BACKGROUND OF THE INVENTION

This invention is directed generally to an improvement in a mounting arrangement for a temperature sensor, and more particularly to an arrangement for mounting a temperature sensor in apparatus for heating liquid.

Generally speaking, hot water heating and/or beverage brewing apparatus include a hot water reservoir from which heated water is dispensed in predetermined serving volumes through a beverage filter to a serving beaker, or directly to a hot water spigot. In many such devices, a volume of cold water is first admitted to a lower or inlet zone of the reservoir which is then heated by an electric resistance heating element within the reservoir. This heated volume is then dispensed in a volume equal to the desired serving volume from an upper outlet zone of the reservoir, coincident with the introduction of further cold water into the inlet zone.

Hence the reservoir has a volume greater than twice the serving volume so that the volume of resident heated water kept on hand is such that a further volume of heated water will be available relatively quickly following a dispensing.

In such apparatus a temperature sensing element, for example a thermistor, is disposed within the lumen of a hollow, heat-conductive tubing, extending to a predetermined depth or location in the brew-zone, at or near the center of the reservoir. This temperature sensing element produces a temperature control signal which indicates the temperature of the water in the brew-zone; i.e., the zone to which the tubing extends. Preferably, the temperature sensing element is disposed at or near the end of the tubing which extends into the reservoir.

One such beverage brewing apparatus containing a temperature sensing element disposed within a hollow tubing is shown for example in prior U.S. Pat. No. 4,531,046, which is commonly assigned herewith. In this U.S. patent, the conductive tubing is preferably constructed of a length of heat-conductive metal tubing which may be made from a copper material having a closed end which extends into the reservoir. However, other metal tubing, such as stainless steel tubing, has also been utilized for this purpose. As such, the copper or stainless steel tubing affords protection to the thermistor against exposure to the liquid within the reservoir. The rigidity of the tubing also allows the thermistor to be relatively accurately positioned near the desired central portion of the reservoir. In the above-mentioned U.S. patent, it is also suggested to accomplish the desired positioning of the thermistor by crimping or deforming the tubing segment when the thermistor had been properly positioned therein.

As an additional matter, such stainless steel tubing also has a relatively long service life, even when immersed over long periods of time in hot water, and provides a reliable and relatively sanitary material for this purpose. However, the use of stainless steel material, and its fabrication into tubing of this sort has proven relatively expensive in practice.

Accordingly, we propose an alternate form of mounting arrangement for a temperature sensing element which nonetheless meets all of the requirements of mounting the same for prolonged periods of time within a hot liquid, or hot water contained in a reservoir.

OBJECTS AND SUMMARY OF THE INVENTION

Accordingly, it is a general object of the present invention to provide a novel and improved mounting arrangement for mounting a temperature sensing element in a reservoir for sensing the temperature of a liquid contained therein.

A more specific object is to provide an improved mounting arrangement which is relatively less expensive than mounting arrangements heretofore utilized and which nonetheless maintained comparable operating efficiency and comparable durability.

Briefly, in accordance with the foregoing objects the invention provides an elongate hollow tubular apparatus for mounting a temperature sensing element in a reservoir to determine the temperature of a liquid in said reservoir, said tubular apparatus comprising an outer tubular member constructed of a moldable, water-impervious, heat-resistant and durable material; and means for sealing an end of said outer tubular member which extends into the reservoir.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawing in which like reference numerals identify like elements, and in which:

FIG. 1 is a perspective view of a beverage brewing apparatus in connection with which the present may be advantageously utilized;

FIG. 2 is a simplified perspective view, somewhat diagrammatic in form, of certain principal elements of the brewing apparatus of FIG. 1 and the manner in which a temperature sensor mounted by the arrangement of the invention is employed therein;

FIG. 3 is an enlarged, sectional view, partially broken away, and illustrating in somewhat diagrammatic form the details of construction of the mounting arrangement of the invention;

FIG. 4 is a sectional view taken generally along the line 4—4 of FIG. 3;

FIG. 5 is a sectional view taken generally along the line 5—5 of FIG. 3; and

FIG. 6 is an exploded perspective view, partially broken away, illustrating in somewhat diagrammatic form the assembly of the components of the invention; and FIG. 7 shows an alternate form of construction for an outer tubular member of the invention.

DETAILED DESCRIPTION OF THE ILLUSTRATED EMBODIMENT

Referring now to the drawings, and initially to FIG. 1, a beverage brewing and dispensing apparatus in connection with which the invention may be advantageously utilized is indicated generally by reference numeral 10. In the embodiment illustrated for purposes of description, the apparatus 10 comprises a cold water pour-in coffee maker which has an upper body portion 12, a lower body or base portion 14, and an upright interconnecting body portion 16. A brewer funnel 15 is removably supported underneath the upper body portion 12 and a coffee serving beaker 17 is supported on the base portion 14 under the brewer funnel 15 on a warming plate 18 mounted on the top surface of the base 14.

Referring now also to FIG. 2, a cold water pour-in opening 20, located at a top portion of the upper body portion 12 is provided for introducing cold water to be heated for the brewing of beverages such as coffee by apparatus 10. The water is introduced into a basin 22 which, in turn, communicates with an elongated, downwardly depending hot water reservoir 24. The cold water basin 22 and hot water reservoir 24 are preferably constructed of a stainless steel sheet material The volume of the hot water reservoir is preferably about twice the volume of a serving batch prepared by the brewer; that is, the volume of serving beaker 17. In this way a volume of resident water is kept heated by an electrical heating element 26 which is mounted in the bottom portion of hot water reservoir 24. A cold water tube 28 receives the cold water from basin 22 at its upper portion and delivers cold water downwardly to a point just above the heating element 26. Hence, when cold water is introduced, it tends to displace the hot water upwardly into and through a siphon tube 30 which feeds the hot water into a suitable spray-head or the like (not shown), located immediately over the brewer funnel 15.

An on/off switch 32 controls electrical power to the heating element 26 in connection with a control circuit 34. This control circuit 34 further controls the power in accordance with a temperature sensing element or thermistor 36, also mounted within the hot water reservoir 24. Leads 37 connect the thermistor 36 to the control circuit 34. Preferably, thermistor 36 is mounted within the lumen of an elongate hollow tubular element or member 38 which extends downwardly to the desired level within the reservoir 24 to hold the thermistor 36 at this desired level.

Heretofore, the thermistor mounting tube 38 had been constructed of a heat conductive metal such as copper, or of stainless steel. The use of the tubing 38 of such rigid material, in addition to protecting the thermistor to exposure to the liquid within the reservoir, also allows the thermistor to be accurately positioned at or near the central portion of the reservoir. Moreover, adjustment of the position was often accomplished by manually deforming or crimping the metal tubing segment to accomplish the desired positioning of the thermistor. Further details of the coffee brewer 10 are described in the above-referenced prior U.S. Pat. No. 4,531,046.

Departing from the prior art, and referring now to the remaining FIGS. 3-6, the present invention presents a novel and improved mounting arrangement or assembly for mounting thermistor 36 in the desired location within the hot water reservoir 24. The novel mounting assembly in accordance with the invention is designated generally by the reference numeral 40. In accordance with the present invention, the mounting arrangement or assembly 40 comprises an elongate, hollow tubular assembly defining a lumen 42 for receiving the temperature sensing element 36 therewithin.

The tubular assembly 40 comprises a first or inner tubular member 44, which is constructed of a thin, lightweight electrically insulating and thermally conducting material. Preferably, the material chosen for the inner tubular member is a material designated as Kapton, which is a relatively thin, light-weight electrical insulator material. This material has little or no effect on the thermal conduction of heat from the heated liquid to the thermistor or temperature sensor 36. This Kapton material is a polyamide film, one example of which is sold by DuPont, Wilmington, Del. 19342.

The tubular assembly 40 also includes an intermediate tubular member 46, which is constructed of a thin, heat-sealable dielectric material, and has its lower end 48, which extends into the reservoir, heat-sealed. For the intermediate member 46 we have chosen a Teflon material, which is a trademark for synthetic fluorine containing resin-based materials, also available from DuPont, Wilmington, Del.

As mentioned above, the Teflon is also a heat-sealable material, such that a lowermost end thereof; i.e., that end which extends into the reservoir, is heat-sealed, as indicated at reference numeral 48. The Kapton material is not such a heat-sealable material, but was chosen primarily for its desirable dielectric properties.

Hence the intermediate layer of Teflon was added primarily for adequately sealing the lower end 48 of the assembly thus far described. The Teflon also adds some dielectric to the Kapton material, but is used in the present invention primarily for its sealing capabilities.

Finally, a relatively more rigid outer tubular member 50 is provided of a silicone rubber material. This outer tubular member of silicone rubber is moldable, water-impervious and heat-resistant, and a relatively durable material. The silicone rubber has sufficient durability and rigidity to reliably mount the thermistor 36 at the desired level within the reservoir 24. The silicone rubber material is also relatively resistant to bacterial growth and the like, and thus is a suitable substitute for stainless steel. While the silicone rubber material of outer tube 50 has some heat insulating qualities, we have found that the thermistor 36 comes to the temperature of the liquid in the reservoir with a delay of no more than about seven seconds, which is not a significant delay in a brewing machine of the type shown in FIG. 1, for example.

In accordance with the preferred form of the invention illustrated herein, an additional sealing means is provided for sealing the end of the outer tubular member 50 which extends into the reservoir 24. In the embodiment illustrated in FIGS. 3 and 6, this sealing means comprises an additional plug or plug-like member 52 which is shaped for entering and engaging an outer open end of the outer tubular member 50. A quantity of adhesive may also be utilized to secure the plug member 52 in sealing engagement with the end of the tubular member 50. Alternatively, the tubular member 50, being of a moldable silicone rubber material, may be premolded with a closed end as indicated by reference numeral 50a in FIG. 7 in much the same shape and configuration, at least as to its external appearance, as the plug member 52.

An additional top-sealing or closure member may also be either molded into the outer tubular member 50 or provided in the form of a separate enlarged annular grommet-like member 54 adhesively secured thereto. A suitable through opening 56 is provided in the top member 54 to permit exit of the leads 37 for thermistor 36 therethrough.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention claimed as follows:

1. In apparatus for heating a liquid and having a heated liquid reservoir and a temperature sensing element to be disposed in a reservoir for sensing the temperature of the liquid therein, an improved mounting arrangement for mounting said temperature sensing element in a reservoir comprising:

An elongate hollow tubular assembly defining a lumen for receiving said temperature sensing element therewithin;

said tubular assembly comprising an inner tubular member member constructed of a thin, lightweight electrically insulating and thermally conducting a polyamide film material, an intermediate tubular member constructed of a thin, heat-sealable dielectric polytetrafluoroethylene material and having a heat-sealed end which is adapted to extend into a reservoir; and an outer tubular member constructed of a moldable, water-impervious, heat-resistant, durable silicone rubber material;

and means for sealing an end of said outer tubular member which is adapted to extend into a reservoir.

2. A mounting arrangement according to claim 1 and further including means for feeding electrical leads from said temperature sensing means through an end of said tubular assembly opposite the end thereof which extends into said reservoir.

3. A mounting arrangement according to claim 1 wherein said outer tubular member is molded with a closed end at the end thereof which extends into said reservoir, thereby defining said sealing means.

4. A mounting arrangement according to claim 1 wherein said sealing means comprises an end plug member of similar material to that of said outer tubular member and means for adhesively securing said end plug member to said end of said outer tubular member which extends into said reservoir.

5. An elongate hollow tubular apparatus for mounting a temperature sensing element in a reservoir to determine the temperature of a liquid in a reservoir, said tubular apparatus comprising:

an inner tubular member constructed of a thin, lightweight, electrically insulating and thermally conducting a polyamide film material, an intermediate tubular member constructed of a thin, heat-sealable, dielectric polytetrafluoroethylene material, having a heat-sealed end which is adapted to extend into a reservoir; and an outer tubular member constructed of a moldable, water-impervious, heat-resistant and durable silicon rubber material;

and means for sealing an end of said outer tubular member which is adapted to extend into a reservoir.

6. A mounting arrangement according to claim 5 and further including means for feeding electrical leads from said temperature sensing means through an end of said tubular assembly opposite the end thereof which extends into said reservoir.

7. A mounting arrangement according to claim 5 wherein said outer tubular member is molded with a closed end at the end thereof which extends into said reservoir, thereby defining said sealing means.

8. A mounting arrangement according to claim 5 wherein said sealing means comprises an end plug member of similar material to that of said outer tubular member and means for adhesively securing said end plug member to said end of said outer tubular member which extends into said reservoir.

* * * * *